(12) United States Patent
Karasikov

(10) Patent No.: US 11,329,575 B2
(45) Date of Patent: May 10, 2022

(54) ARCUATE MOTION ACTUATOR BASED ON PIEZO-ELECTRIC MOTORS

(71) Applicant: NANOMOTION LTD, Yokneam (IL)

(72) Inventor: Nir Karasikov, Haifa (IL)

(73) Assignee: NANOMOTION LTD., Yokneam (IL)

( * ) Notice: Subject to any disclaimer, the term of this patent is extended or adjusted under 35 U.S.C. 154(b) by 919 days.

(21) Appl. No.: 16/081,945

(22) PCT Filed: Mar. 1, 2017

(86) PCT No.: PCT/IL2017/050262
§ 371 (c)(1),
(2) Date: Sep. 3, 2018

(87) PCT Pub. No.: WO2017/149541
PCT Pub. Date: Sep. 8, 2017

(65) Prior Publication Data
US 2019/0097547 A1    Mar. 28, 2019

Related U.S. Application Data

(60) Provisional application No. 62/301,644, filed on Mar. 1, 2016.

(51) Int. Cl.
*H02N 2/10* (2006.01)
*F42B 10/64* (2006.01)
*B64G 1/24* (2006.01)
*B64C 13/50* (2006.01)
*B64C 13/00* (2006.01)

(52) U.S. Cl.
CPC ............. *H02N 2/103* (2013.01); *B64C 13/00* (2013.01); *B64C 13/50* (2013.01); *B64G 1/244* (2019.05); *F42B 10/64* (2013.01)

(58) Field of Classification Search
CPC ......... H02N 2/103; F42B 10/64; B64C 13/00; B64C 13/50; B64C 9/02; B64B 1/244
See application file for complete search history.

(56) References Cited

U.S. PATENT DOCUMENTS 6,082,672 A * 7/2000 Audren ................ B64C 13/50
310/323.03
2001/0035477 A1   11/2001 Fink
(Continued)

FOREIGN PATENT DOCUMENTS

JP         2980541 B2    11/1999
WO     2013/022507 A2    2/2013

OTHER PUBLICATIONS

Azhar et al., Flapping Wings via Direct-Driving by DC Motors, IEEE International Conference on Robotics and Automation (ICRA), May 6-10, 2013, pp. 1397-1402 (Year: 2013).*

*Primary Examiner* — Emily P Pham
(74) *Attorney, Agent, or Firm* — William H. Dippert; Laurence A. Greenberg; Werner H. Stemer

(57) ABSTRACT

A flap actuator for adjusting the orientation of a flap or the like, the actuator. The actuator includes: a static arcuate member having a radius of curvature; a piezoelectric motor biased to be in operable contact with the static arcuate member; a housing for housing the piezoelectric motor; and a flap orientation shaft operably connecting between the housing and the flap. The distance between the shaft and the static arcuate member is essentially equal to the radius of curvature of the static arcuate member.

11 Claims, 5 Drawing Sheets

(56) References Cited

U.S. PATENT DOCUMENTS

2011/0050035 A1    3/2011  Wischnewskty
2015/0307191 A1*  10/2015  Samuel .................. B64C 33/02
                                                                244/22

* cited by examiner

ARCUATE MOTION ACTUATOR BASED ON PIEZO-ELECTRIC MOTORS

FIELD OF THE INVENTION

The present invention relates to motion actuating systems, in particular electromechanical motion actuating systems.

BACKGROUND OF THE INVENTION

Fins and other steering surfaces (e.g. ailerons, wings, flaps and rudders) are used to guide and/or maneuver and/or control numerous devices, for example: UAV's, launched projectiles and missiles; optical elements (e.g. to manipulate the angle of mirrors, filters, shutters and prisms); theta-phi (pan and tilt) gimbals; valve control actuators; and safe and arm devices. The flaps are actuated by motors. In the case of rockets, four fins are required.

Examples of devices that can be used for flap actuation are disclosed in: U.S. Pat. No. 5,824,910 (Last, et al., 1998 Oct. 20) entitled "Miniature Hydrostat Fabricated Using Multiple Microelectromechanical Processes"; U.S. Pat. No. 6,069,392 (Tai, et al., 2000 May 30) entitled "Microbellows Actuator"; and U.S. Pat. No. 6,474,593 (Lipeles, et al., 2002 Nov. 5) entitled "Guided Bullet".

U.S. Pat. No. 5,824,910 discloses a hydrostat constructed on a silicon wafer by microfabrication methods similar to those used for integrated circuits. A thin section of the wafer acts as a diaphragm, responsive to pressure. A lever arm is affixed at the wafer's first end to one point on the surface of the wafer and extends over the diaphragm, so arranged that the lever arm will be forced away from the wafer when pressure is applied to the diaphragm. The second end of the lever arm is moved by the diaphragm so that the arm moves further from the wafer, by a factor of the mechanical advantage of the lever. When the second end moves away from the wafer, the second end mechanically releases an ordnance device lock, to which the hydrostat is attached, thereby arming the ordnance device.

U.S. Pat. No. 6,069,392 describes a device that provides out-of-plane deflection. The device includes a micro-machined, multi-layered, microbellows-style actuator capable of delivering larger deflections compared to a single layered flat membrane of comparable size. Anchor structures improve the strength of the micro-bellows membrane. A characterization apparatus is used to measure micro-bellows membrane performance. Thermo-pneumatic actuators having a resistive heater chip are also disclosed.

U.S. Pat. No. 6,474,593 discloses a projectile having a plurality of MEMS devices disposed about the axis of flight for active control of the trajectory of the projectile. Each MEMS device forms an integral control surface/actuator. Control circuitry installed within the projectile housing includes both rotation and lateral acceleration sensors. Flap portions of the MEMS devices are extended into the air stream flowing over the projectile in response to the rate of rotation of the projectile, thereby forming a standing wave of flaps operable to impart a lateral force on the projectile. MEMS devices utilizing an electrostatically controllable rolling flap portion provide a large range of motion while consuming a small amount of power. Packaging concepts for projectiles as small as a 30 caliber bullet are described.

In addition, U.S. Pat. No. 6,513,762 (issued 2003 Feb. 4) and U.S. Pat. No. 6,508,439 (issued 2003 Jan. 21) entitled "Flap actuator system", (Fink et al.) disclose a flap actuator system for an airfoil structure including: a flap member for controlling the airfoil structure; a bearing member interconnected with the flap member and the airfoil structure; and an actuator device for rotating the flap member about the bearing member relative to the airfoil structure. The actuator device includes an electromagnetic motor segment and a drive mechanism driven by the electromagnetic motor to rotate the flap member about the axis of the bearing member relative to the airfoil structure. The electromagnetic motor is integral with the airfoil structure and the drive mechanism and includes a field circuit integral with the drive mechanism and an armature circuit integral with the airfoil structure. The field circuit is located within the armature circuit.

All of the aforementioned patent publications are incorporated herein by reference in their entirety.

None of the above publications provide for a direct drive between the motor and the fin/flap control (because traditionally, one or more gears are typically used) or between velocity and torque.

SUMMARY OF THE INVENTION

The present invention relates to angular actuators or motion actuating devices for actuating arcuate or rotational motion. Such actuators can be used in a variety of guidance or manipulation applications including UAV's, projectiles and missiles; optical elements (e.g. to manipulate the angle of mirrors, filters, shutters and prisms); theta-phi gimbals; valve control actuators; and safe and arm devices.

In accordance with embodiments of one aspect of the present invention there is provided a flap actuator for adjusting the orientation of a flap or the like. The flap actuator includes: a static arcuate member having a radius of curvature; a piezoelectric motor biased to be in operable contact with the static arcuate member; a housing for housing the piezoelectric motor; and a flap orientation shaft operably connecting between the housing and the flap. The distance between the shaft and the static arcuate member is essentially equal to the radius of curvature of the static arcuate member.

In some embodiments, the flap actuator is configured to adjust at least one projectile or missile flap. In some embodiments, the piezoelectric motor is biased by a spring. In some embodiments, the spring has a strength of over 24N. In some embodiments, the piezoelectric motor contacts the static arcuate member via a nub. In some embodiments, the nub has a length less than 3.5 mm. In some embodiments, the nub has a length in the range of 1.5-2.0 mm. In some embodiments, the housing has a substantially trapezoidal shape, tapering toward the static arcuate member.

In accordance with embodiments of another aspect of the present invention there is provided a method of adjusting a flap or the like of a device. The method includes: providing an electric signal to a piezoelectric motor, the motor housed within a housing that is operationally connected to a shaft, the motor including a nub operationally connected to a static arcuate member having a radius of curvature essentially equal to the distance between the static arcuate member and the shaft, the static arcuate member being connected to the device, wherein the strength of the electric signal provided and the motor are configured to rotate the shaft to orient the flap to a desired position.

In some embodiments, the piezoelectric motor moves the nub in contact with inner surface of the static arcuate member. In some embodiments, the device is a projectile or missile or UAV.

The present arcuate motion actuator (which can also be referred to as a "fin servo") and method allow for military rated design for direct drive, low weight, low volume and high performance flap actuators. The use of piezoelectric motors obviates the use of certain mechanical components such as gears, levers and the like; and no clutch is required. Particular features/advantages include:

Extensive travel; high resolution—down to the microradian level, as so to provide high precision control; wide velocity dynamic range; fast response time; superior "move and settle" performance; compact dimensions; light weight; low volume; high power density; direct drive, and thus no backlash as with gears or levers, due to the direct-drive structure; built-in holding/braking without power consumption; no intrinsic magnetic field (no EMI); low power consumption (holds fin/flap position at maximum torque with zero power); high reliability (few mechanical components); and no clutch is required.

The principle of the actuation motor is based on a motor housing with a shaft extending therefrom. One or more piezo elements (piezo-electric motors) are disposed inside the housing, driving against a static arc and rotating around the shaft; or alternatively (typically) the housing rotates the shaft. The dual approach of a static motor and a rotating arc is also within the scope of this invention but the required space will likely be larger.

By way of example only, typically, each motor element (piezo-electric motor) provides a maximum driving and holding force of 4N, hence the torque achieved by each motor element equals 4N times the number of motor elements times the operation radius (distance between the shaft and the arc). The latter distance is essentially the system "gear", compensating between velocity and torque. It should be understood however, that the concept is scalable where smaller/lower power motors and fewer motors can be used. It should be noted that the torque can be increased by adding piezo-electric motor elements. It should also be understood that the rotation radius can be changed, thereby affecting the torque.

As four independent axes/drives are preferably used to manipulate the flaps, four motors are designed into the housing. Each motor is driven and controlled in by a controller driver, which can be in a closed loop configuration or open loop configuration. Considerations apply to application demands (environmental, positioning, torque/velocity, response time, etc.).

In accordance with some embodiments, a small motor package is used. The present actuator uses standard piezoelectric motors and the motors are strengthened by short tips (nubs of the piezo-electric motor) and increased pre-load (spring strength), which is another approach to manipulate the trade-off between angular velocity and torque) with a shape compatible and configured to operate on ("within") a concave surface (arc). Embodiments relating to packaging of the motor elements are part of the structure to minimize package volume. Operation (movement) can be long or short in range; have a high and short duty cycle.

Thus, there is provided a high performance solution for flap actuation benefiting from piezo technology features. Moreover, the design is flexible, and can be optimized to application-specific requirements—for example by configuring the shaft in a different position (i.e. closer or further from the arc, changing the radius; distance from the nub to the shaft).

BRIEF DESCRIPTION OF THE DRAWINGS

The present invention will be understood and appreciated more fully from the following detailed description taken in conjunction with the appended drawings in which.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DESCRIPTION OF EMBODIMENTS OF THE INVENTION

Illustrative embodiments of the invention are described below. In the interest of clarity, not all features/components of an actual implementation are necessarily described.

While the present arcuate motion actuator or "arc motor" is implementable in a wide variety of applications, as listed above, the actuator will be described with respect to flap actuators, and specifically missile flap applications, herein below.

Figure 1:
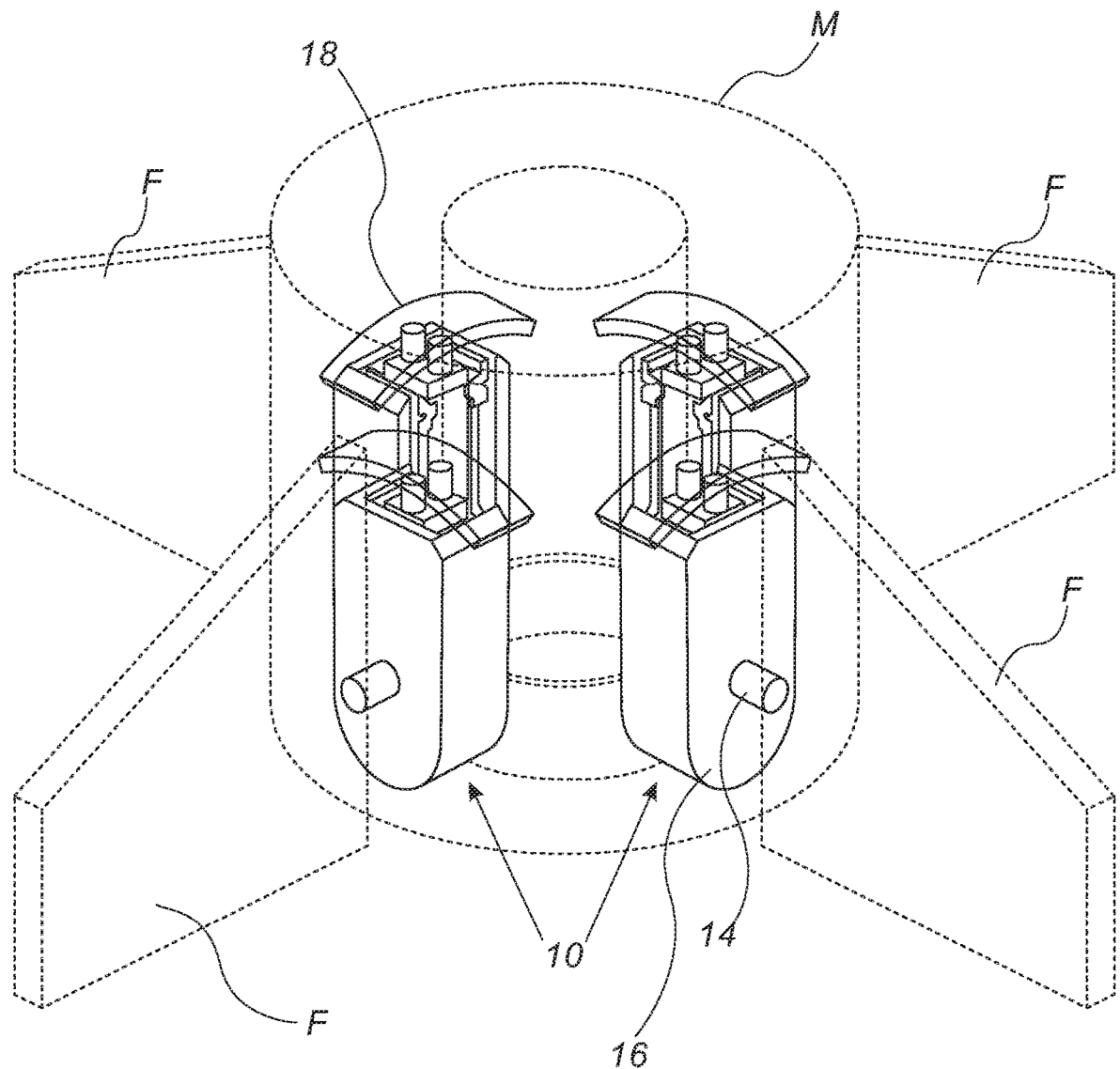
FIG. 1 is a perspective view of an embodiment of a flap actuator of the present invention, illustrating four flap actuators associated with respective rocket flaps.
Figure 2:
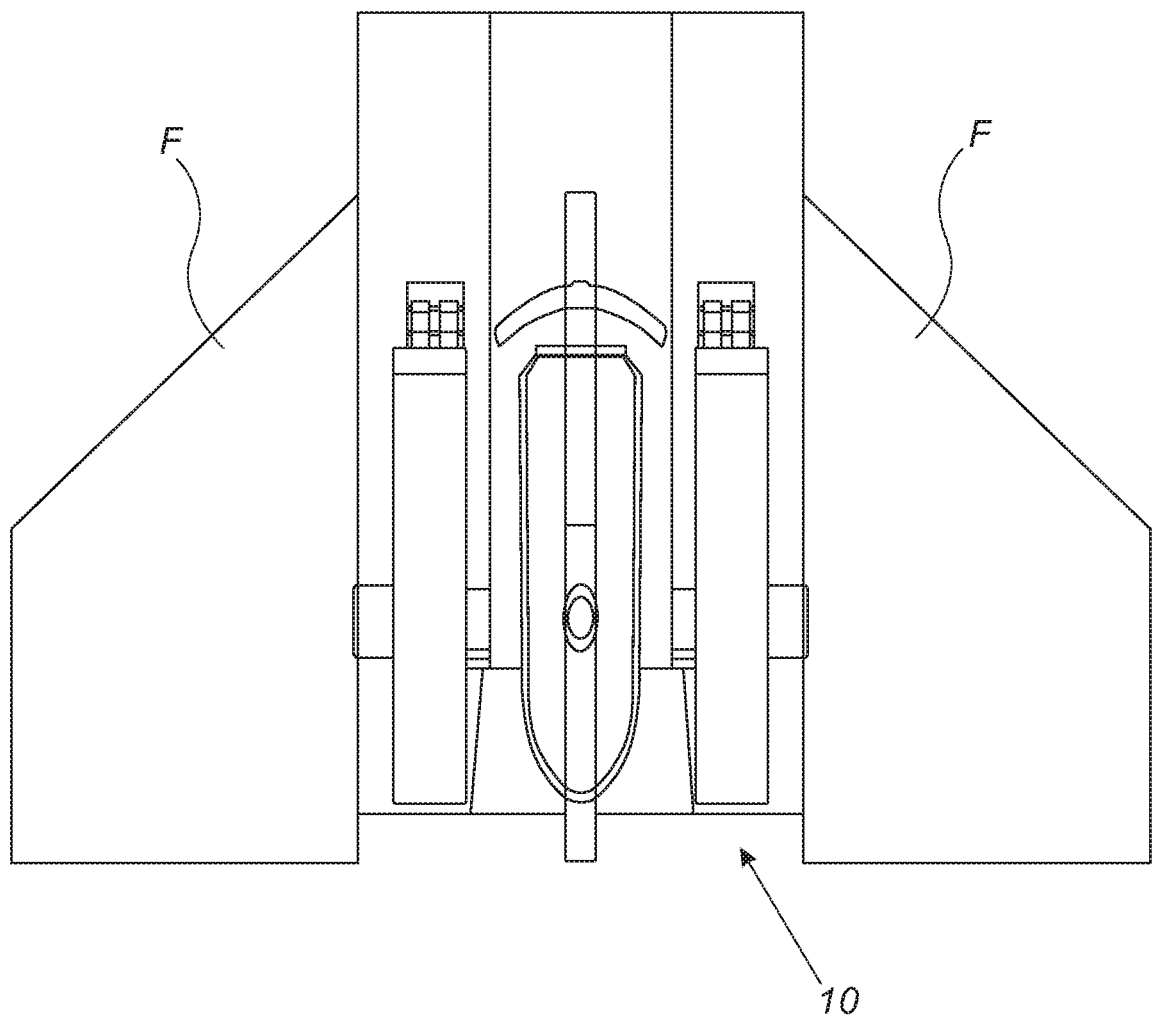
FIG. 2 is a side view of FIG. 1.
Figure 3:
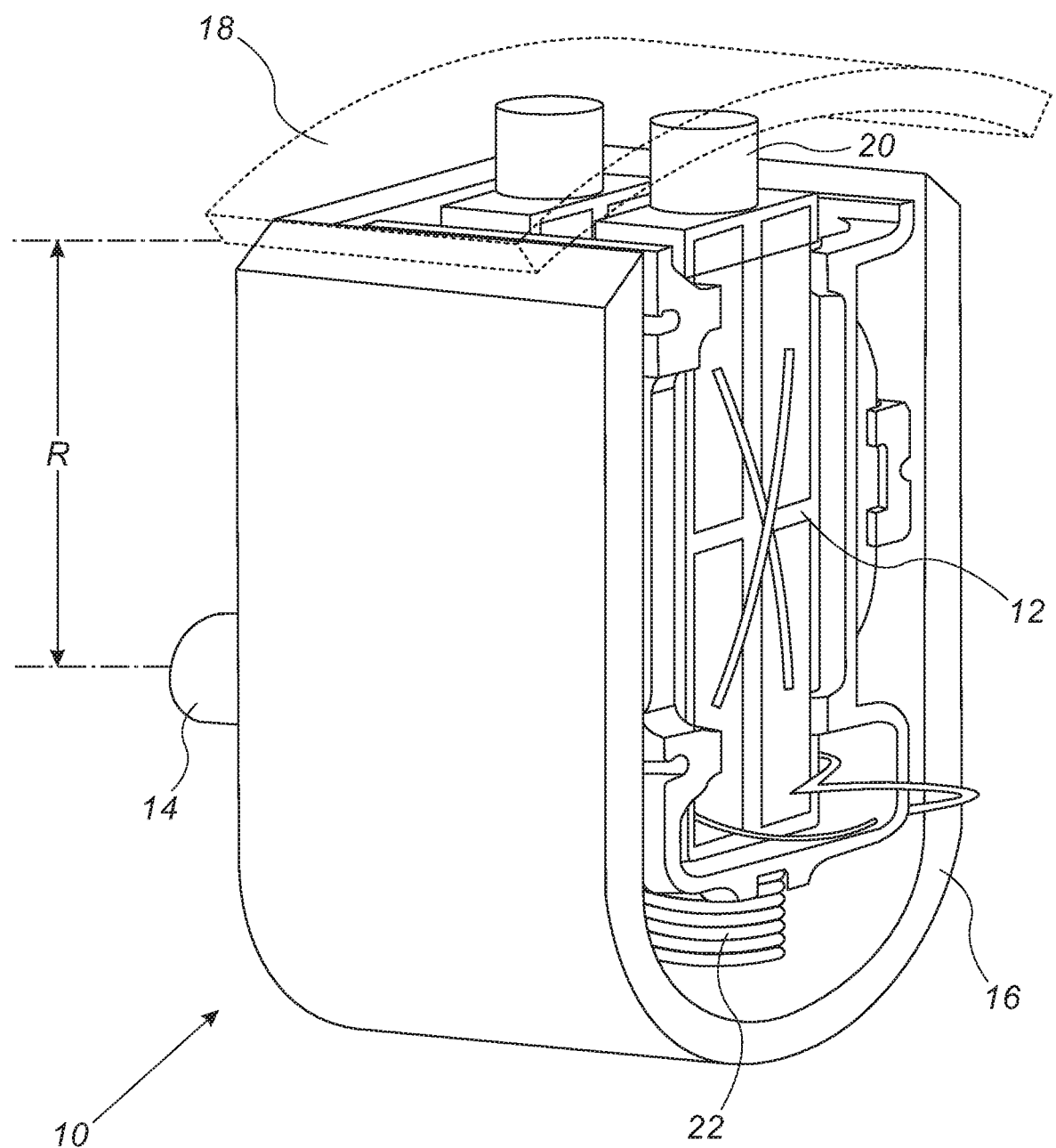
FIG. 3 is a perspective view of internal components of the flap actuator of FIG. 1.

FIGS. 1-3 show embodiments of a flap actuator 10 of the present invention associated with a flap F of a projectile (e.g. a missile M, a portion thereof shown); and the internal components of the flap actuator including a piezoelectric motor 12; a shaft 14, which is operatively attachable to flap F; a motor housing 16; and a static arcuate member 18, which operatively interfaces with the piezoelectric motor. Piezoelectric motor 12 has associated therewith, or as a part thereof, a nub 20, interfacing with static arcuate member 18; and a biasing member such as a spring 22 for biasing the motor to continually interface with the static arcuate member.

In some embodiments, there is a dual implementation of the static motor and the rotating arc; in some of those embodiments.

Note, the radius of curvature of static arcuate member 18 is equal to the distance R from nub 20 to shaft 14.

Figure 4:
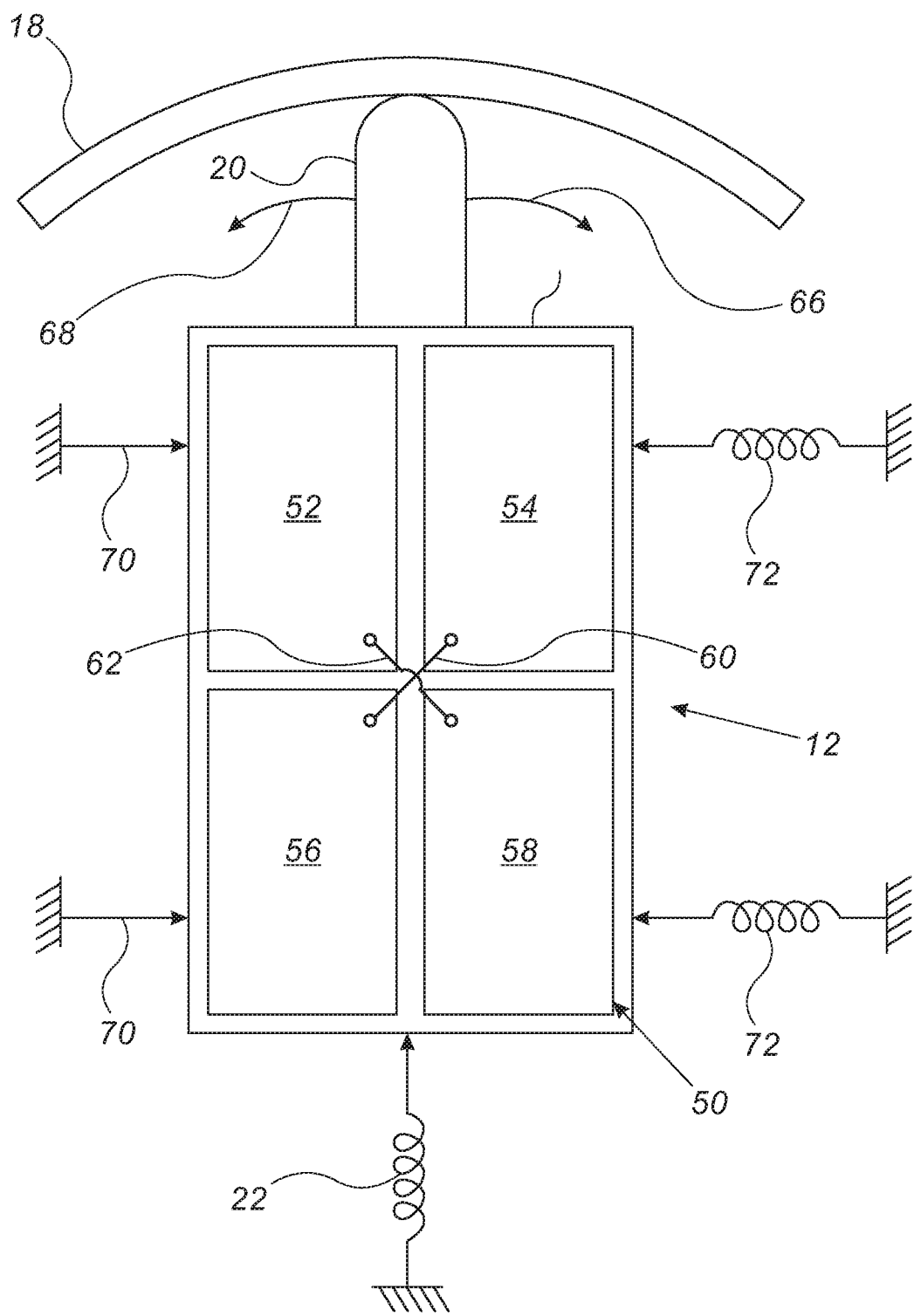
FIG. 4 is a planar view of an exemplary piezoelectric motor usable in the present actuator.

FIG. 4 illustrates an exemplary piezoelectric motor that can be used, mutatis mutandis, as piezoelectric motor 12, as disclosed for example in U.S. Pat. No. 5,453,653 (Zumeris, 1995 Sep. 26), incorporated herein by reference in its entirety, however, in some embodiments, with a tapered (e.g. trapezoid housing). The tapered housing 16 (FIG. 5) is a particular feature of the design that is preferred for implementations that use an arcuate member 18 that is particularly curved (i.e. has a small radius of curvature); and/or uses a short tip/nub 20.

An exemplary piezoelectric motor 12 is shown including a piezoelectric plate 50 with four electrodes 52, 54, 56 and 58 plated or otherwise attached onto a first side or face of the piezoelectric plate to form a checkerboard pattern of rectangles (or other appropriate shapes), each typically covering one-quarter of the first face. The opposite or second side/face of piezoelectric plate 50 is substantially fully covered with a single electrode (not shown). Diagonally located electrodes (52 and 56; 54 and 58) are electrically connected by wires 60 and 62 preferably placed near the junction of the four electrodes. The single electrode on the second face is preferably electrically grounded. Alternatively, the electrodes can be connected by multi layer techniques similar to those used to form the electrodes. Nub 20 is, for example, constituted by a relatively hard ceramic material/member, with is typically attached, for example with cement, to an edge 64 of piezoelectric plate 50, typically at the center of the edge. Piezoelectric motor 12 can be held in contact with housing 16 via connecting members and/or biasing members as respectively illustrated by members 70 and 72.

As mentioned, piezoelectric motor 12 also includes or has an associated biasing member such as spring 22, which biases the motor, and thus biases nub 20 so the nub is pressed against static arcuate member 18. By applying a voltage to piezoelectric motor 12 its nub 20 is moved. In the present case, nub 20 is typically moved from side to side parallel to the inner surface of static arcuate member 18, as illustrated by arrows 66 and 68. In some implementations, movement of nub 20 along static arcuate member 18 causes housing 16 to rotate about shaft 14, thus causing shaft 14, which is attached to the housing, to rotate, which in turn rotates flap F. In the case of a missile flap, static arcuate member 18 is typically designed to be fixed in place with respect to the missile body so that when nub 20 moves on arcuate member 18, housing 16 rotates, thereby rotating shaft 14 causing the fin/flap F to move. In other implementations, the static arcuate member 18 can be fixed with respect to other suitable/appropriate components 18.

In some embodiments, the arcuate motion actuator includes a mechanical stop (not visible) to prevent the motor "going out of arc".

Additional description and figures showing various embodiments and testing are provided below, related to motor strengthening with a standard piezo-electric motor element, such as motor changes; shortening of the tip (nub 20); and strengthening the spring (spring 22).

Dynamic checks/testing of the strengthened motor: In some embodiments, it is a particular feature that the fins F include a relatively short nub 20 and a relatively high-strength spring 22 (as noted below). This configuration of a short nub 20 and a strong back spring 22, changes the force/velocity curve of the motor to a higher force and lower velocity. As a result, a shorter nub 20 can be used and linear response can be maintained at low voltages, which is important for smooth control. A stronger spring 22 also may improve the flap maximum available force because of a higher preload between nub 20 and static arcuate member 18.

Although a typical a nub length is about 3.5 mm, in some embodiments, nub 20 has a length in the 1.5-2.0 mm range. And, although a typical spring strength is in the 18-24N range, in some embodiments, the strength of spring 22 is greater than 24N, for example 28N, as in the motor test described below.

The motor configuration was checked using a spring with a strength of 28N (average) taking hysteresis into account. Dynamic checks/testing of the strengthened motor (i.e. with high-strength spring 22) was also performed. In some embodiments, it is a particular feature that the fins F include a relatively short nub 20 and a relatively strong spring 22. This configuration of a short nub 20 and a strong back spring 22 changes the force/velocity curve of the motor to a higher force and lower velocity. As a result, a shorter nub 20 can be used and linear operation can be maintained at low voltages, which is important for smooth control. A stronger spring 22 also may improve the reliability of the flap movement because of a stronger interface between nub 20 and static arcuate member 18.

In one exemplary test of a strengthened motor/high-strength spring, spring 22 with a strength of 26.8N (average) was tested, taking hysteresis into account. The maximum speed; braking power and output were checked.

The maximum velocity (mm/second) varied fairly linearly from about 100 mm/second at a command % (at 40400 Hz) of 50% to nearly 300 mm/second at a command % of 100%, whether in the "velocity positive direction" or the "velocity negative direction". Over the same command percentages, the power varied fairly linearly from about 2 W to 8 W. At a Command % of 70%, the maximum speed (very low braking power) was 180 mm/sec; and the power input was 5.6 W. The brake power at the optimal frequency was 7N.

A (standard) HR1 motor was compared to the strengthened motor having a relatively strong spring 22, along with a short nub 20 (tip). When measuring stall force versus maximum velocity at 40400 Hz in the negative direction, at a command % of 70%, the stall force varied from about 7N (at zero mm/second maximum velocity) to zero N at about 180 mm/second maximum velocity. This was in comparison to a stand HR1 reference at 100% command % which varied from about 4N (at zero mm/second maximum velocity) to zero N at about 250 mm/second maximum velocity.

Figure 5:
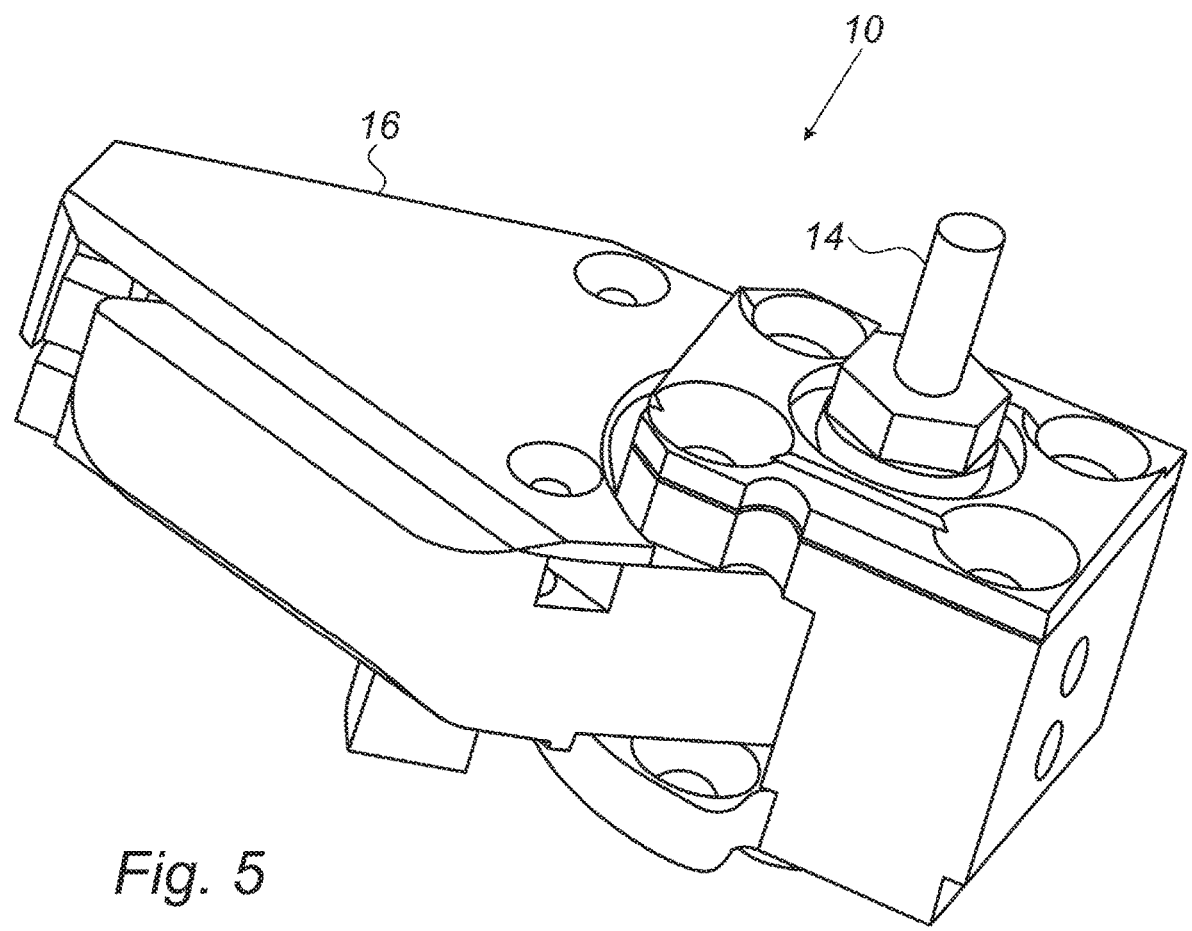
FIG. 5 is a perspective view of an embodiment of the flap actuator in a generally trapezoidal configuration.

FIG. 5 shows an embodiment with a tapered (trapezoidal) motor package (housing 16). The portion of the motor housing 16 that is in proximity to the arcuate member 18 is tapered so that the proximal portion readily fits within the arc (concave) portion of the arcuate member. This is particularly important in implementations where the arcuate member 18 has a small radius of curvature and thus provides little space for the proximal portion of the motor housing 16 (i.e. low-volume applications).

The design described herein was integrated with an XCD Controller/Driver and the expected/desired results for quality and rigidity were achieved.

A miniature servo configuration in accordance to another embodiment was also designed that uses four edge motors configured to fit within a 40 mm tube diameter for low torque. In this case the motor was stationary and the arc moved with the fin. The physical properties are summarized in the table below.

Fin Actuator

Physical Properties

| | |
|---|---|
| Motors | 4 Nanomotion piezo HR2 motors |
| Fin angle | ±25° |
| Tube min. Inside diameter | 75 mm |
| Fin velocity | 120 deg/sec |
| Fin acceleration | 4000 deg/sec$^2$ |
| Angle accuracy | ±0.08° |
| Power supply | 12 V |
| Operating temperature | −25° to +80° |
| Non operating temperature | −40° to +71° |
| Acceleration | 30 g on all axis |

As such, the present invention provides an actuator with several advantages. Also, it should be understood from the above description that, in some embodiments, the moment (i.e. power/velocity relationship) can be affected by the position of shaft 14 relative to the arcuate member 18, namely the distance/radius R (FIG. 3). Additionally or alternatively, using a nub 20 with a different length can produce a similar effect.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

The invention claimed is:

1. A flap actuator for adjusting an orientation of a flap or the like, the flap actuator comprising:
   a static arcuate member having a radius of curvature;
   a piezoelectric motor biased to be in operable contact with the static arcuate member;
   a housing for housing the piezoelectric motor; and
   a flap orientation shaft operably connecting between the housing and the flap, a distance between the flap orientation shaft and the static arcuate member being essentially equal to the radius of curvature of the static arcuate member.

2. The flap actuator of claim 1, wherein the flap actuator is configured to adjust at least one projectile or missile flap.

3. The flap actuator according to claim 1, wherein the piezoelectric motor is biased by a spring.

4. The flap actuator of claim 3, wherein the spring has a strength of over 24N.

5. The flap actuator of claim 1, wherein the piezoelectric motor contacts the static arcuate member via a nub.

6. The flap actuator of claim 5, wherein the nub has a length less than 3.5 mm.

7. The flap actuator of claim 6, wherein the nub has a length in the range of 1.5-2.0 mm.

8. The flap actuator of claim 1, wherein the housing has a substantially trapezoidal shape, tapering toward the static arcuate member.

9. A method of adjusting a flap or the like of a device, the method comprising:
   providing an electric signal to a piezoelectric motor, the piezoelectric motor housed within a housing that is operationally connected to a shaft, the piezoelectric motor comprising a nub operationally connected to a static arcuate member having a radius of curvature essentially equal to a distance between the static arcuate member and the shaft, the static arcuate member being connected to the device,
   wherein a strength of the electric signal and the piezoelectric motor are configured to rotate the shaft to orient the flap to a desired position.

10. The method according to claim 9, wherein the piezoelectric motor moves the nub in contact with an inner surface of the static arcuate member.

11. The method according to claim 9, wherein the device is a projectile or missile or UAV.

* * * * *